United States Patent
Harris

[15] 3,683,677
[45] Aug. 15, 1972

[54] LEAK DETECTOR

[72] Inventor: David S. Harris, 3118 Heatherdowns Blvd, Toledo, Ohio 43614

[22] Filed: June 22, 1970

[21] Appl. No.: 48,320

[52] U.S. Cl. ............................................. 73/49.2
[51] Int. Cl. ............................................. G01m 3/32
[58] Field of Search ......... 73/49.2, 41, 45, 45.1, 45.2, 73/45.3, 37

[56] References Cited

UNITED STATES PATENTS 3,496,761  2/1970  Powers, Jr. ................. 73/45.2
2,084,653  6/1937  Preston ..................... 73/45.1 X

*Primary Examiner*—Louis R. Prince
*Assistant Examiner*—William A. Henry, II
*Attorney*—Philip M. Rice and E. J. Holler

[57] ABSTRACT

Method and apparatus is provided for detecting leaks in plastic bottles and other containers. The device is capable of testing such containers for leaks without relying upon an outside source of air to pressurize the container being tested and can do so at a faster rate than was heretofore possible. Pressured fluid is introduced into the bottle or other container to be tested from a self-contained unit. A pressure switch having a diaphragm type valve is used to detect the presence of a leak. Upon pressurizing the container or as part of the pressurizing step, means are actuated tending to urge the pressured fluid from the bottle thereby speeding up the testing process. Additionally, the present device checks a bottle for the accuracy of its neck or finish portion.

16 Claims, 8 Drawing Figures

PATENTED AUG 15 1972

INVENTOR.
DAVID S. HARRIS
BY Philip M. Rice
& E. J. Holler
ATTORNEYS

INVENTOR.
DAVID S. HARRIS

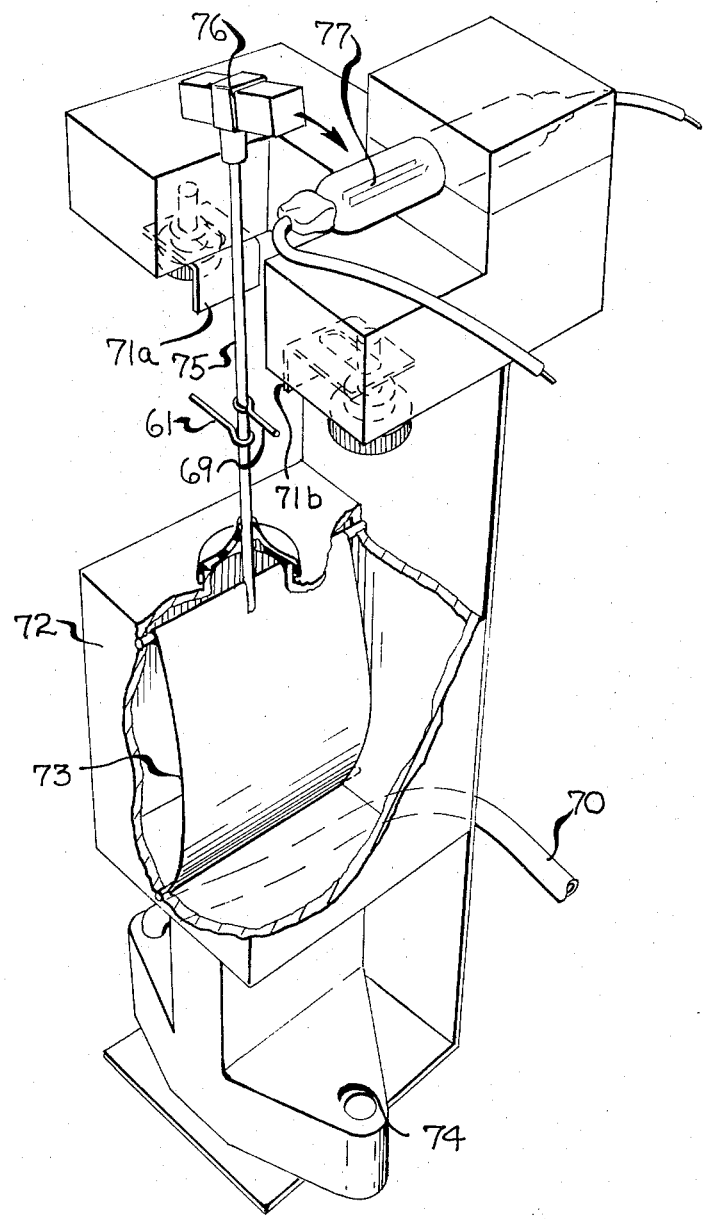
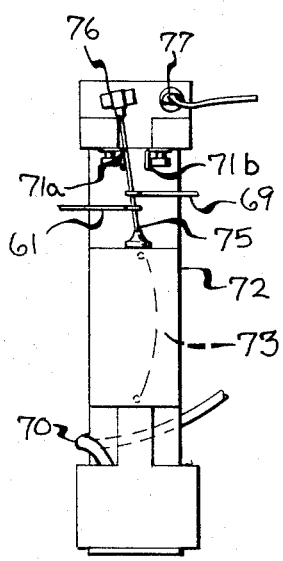
FIG. 7
FIG. 8
INVENTOR.
DAVID S. HARRIS
BY Philip M. Price
& E. J. Holler
ATTORNEYS

LEAK DETECTOR

BACKGROUND OF THE INVENTION

In the forming of plastic bottles, problems are frequently encountered by the presence of minute pin holes in the bottles. Although not readily discernible to the eye, the presence of such pin holes is reason for rejecting the bottle.

Accordingly, it is necessary that plastic bottles be tested to determine whether such bottles have pin holes which would present problems if the bottle were used for packaging goods. The bottles are customarily tested by introducing therein fluid pressure from an outside source and waiting a period of time to see whether such pressure is lost through leakage. The prior art devices have been fairly expensive and have generally required a source of compressed air or similar medium for introducing pressure into the bottle to be tested. Such prior art devices have been cumbersome to operate and have required excessive amounts of time to test individual bottles. Other prior art devices rely on measuring mechanical vibrations produced when a bottle subjected to fluid pressure leaks. Such device is described in U.S. Pat. No. 3,224,252.

Although not necessarily so limited in its application, the improvement feature of the present invention may be used in a leak detector of the type disclosed in application Ser. No. 866,409, filed Aug. 29, 1969, which is assigned to the assignee of the present application.

It is an object of the present invention to provide a new and economical device for leak testing plastic bottles.

It is another object of the present invention to provide a leak detector which is completely self-contained and does not require an outside pressure source.

It is a further object of the present invention to provide a method and apparatus for testing plastic bottles for leaks which is faster than those previously known and yet which is extremely accurate.

Finally, it is an object of the present invention to provide a method and apparatus for checking the neck or finish portion of a container and for rejecting those in which such portion is either too high or too low.

Other objects and advantages of the present invention will become readily apparent from the following detailed description taken in conjunction with the annexed sheets of drawings on which:

FIGS. 7 and 8 are schematic views showing the pressure switch portion of the leak detector.

Figure 5:
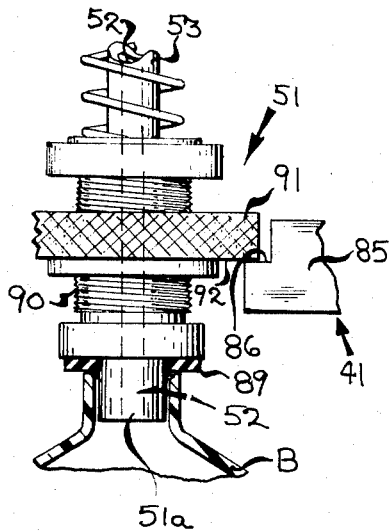
FIG. 5 is an enlarged view of the sealing head.

Referring now to the drawings, there is provided a conveyor belt 10 on any suitable support mechanism 11 for conveying bottles B to the testing station. Positioned above the conveyor 10 is a leak tester generally designated by the numeral 20 supported on guide rods 21 extending upwardly from a frame 22. Secured to the tops of the respective guide rods 21 is a stationary platform 23 having mounted thereon a fluid pressure cylinder 24 having a piston rod 28 extending therefrom. Mounted on the guide rods 21 in slideable relationship thereto is a movable platform 25 to which the free end of the piston rod 28 is connected. Thus, actuation of the fluid pressure cylinder 24 to extend or retract the piston rod 28 serves to raise or lower the platform 25. Secured to the rods 21 is a support member 27 on which is supported an electric eye mechanism 8 for detecting the movement of successive bottles into position for testing.

The movable platform 25 has a pair of cams 34 mounted thereon. Each of the cams has a first vertical face 35, a second face 36 extending downwardly and inwardly therefrom and a third face 37 extending vertically downwardly from the second face 36. The function of the cams 34 will become apparent shortly.

It has been determined that maximum accuracy is obtained if the plastic bottle being tested is out of contact with any support members which would tend to deform the thin, flexible wall thereof. Accordingly, means are provided for supporting the bottles at the relatively rigid neck portions thereof. Such means include a neck grasping mechanism indicated generally by the numeral 40.

Figure 2:
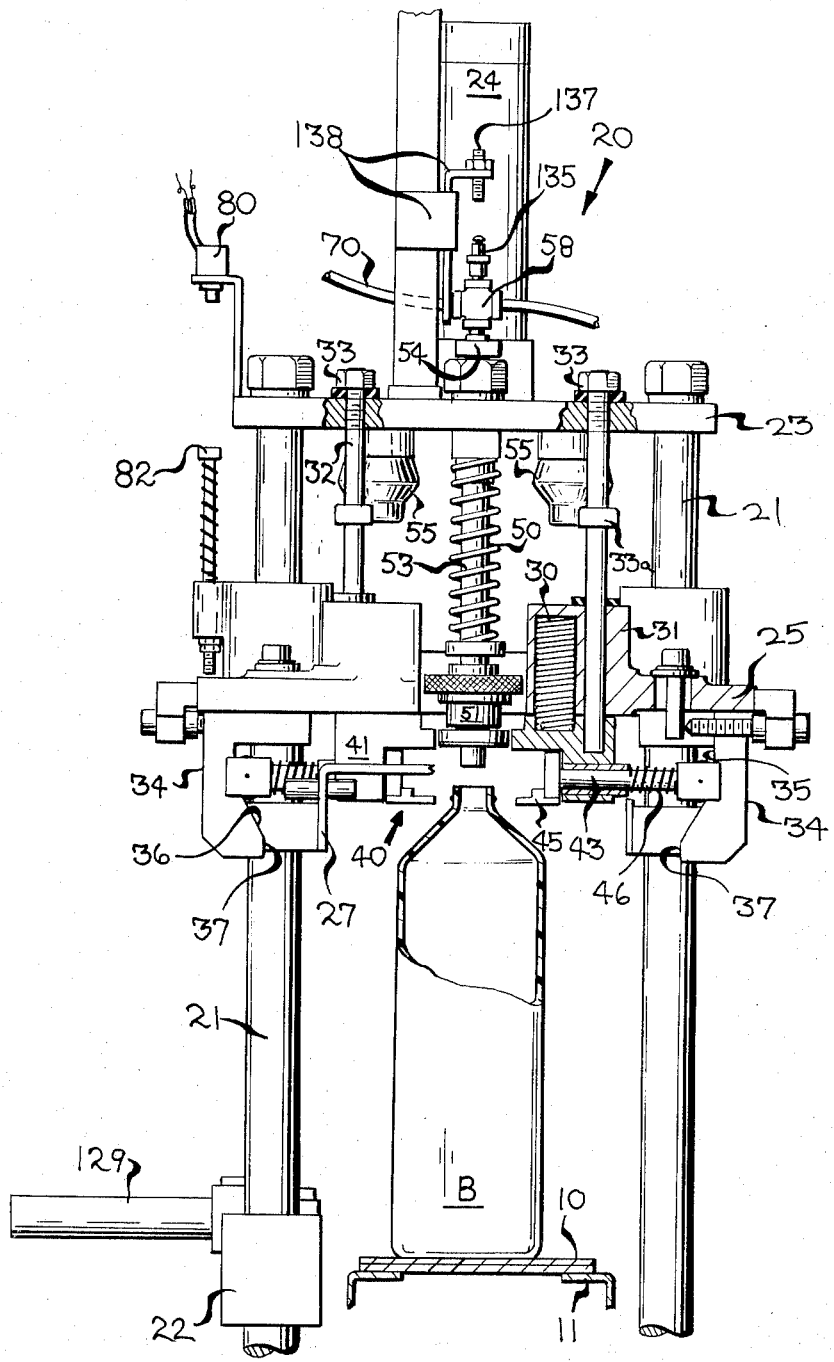
FIG. 2 is an end elevational view thereof.

The neck grasping mechanism includes a pair of support blocks 41 mounted on the lower end of a pair of rods 32. The rods 32 extend upwardly through the stationary platform 23 in a slideable relationship therewith. Such rods also pass through the movable platform 25 and the outside portion of housings 31 mounted thereon and are maintained in slideable relationship therewith. The rods have nuts 33 secured thereto which engage the stationary platform 23 when the blocks 41 are in their lowermost position as illustrated in FIG. 2. Thus, the nuts 33 serve to limit the lowermost position of the support blocks 41.

Figure 3:
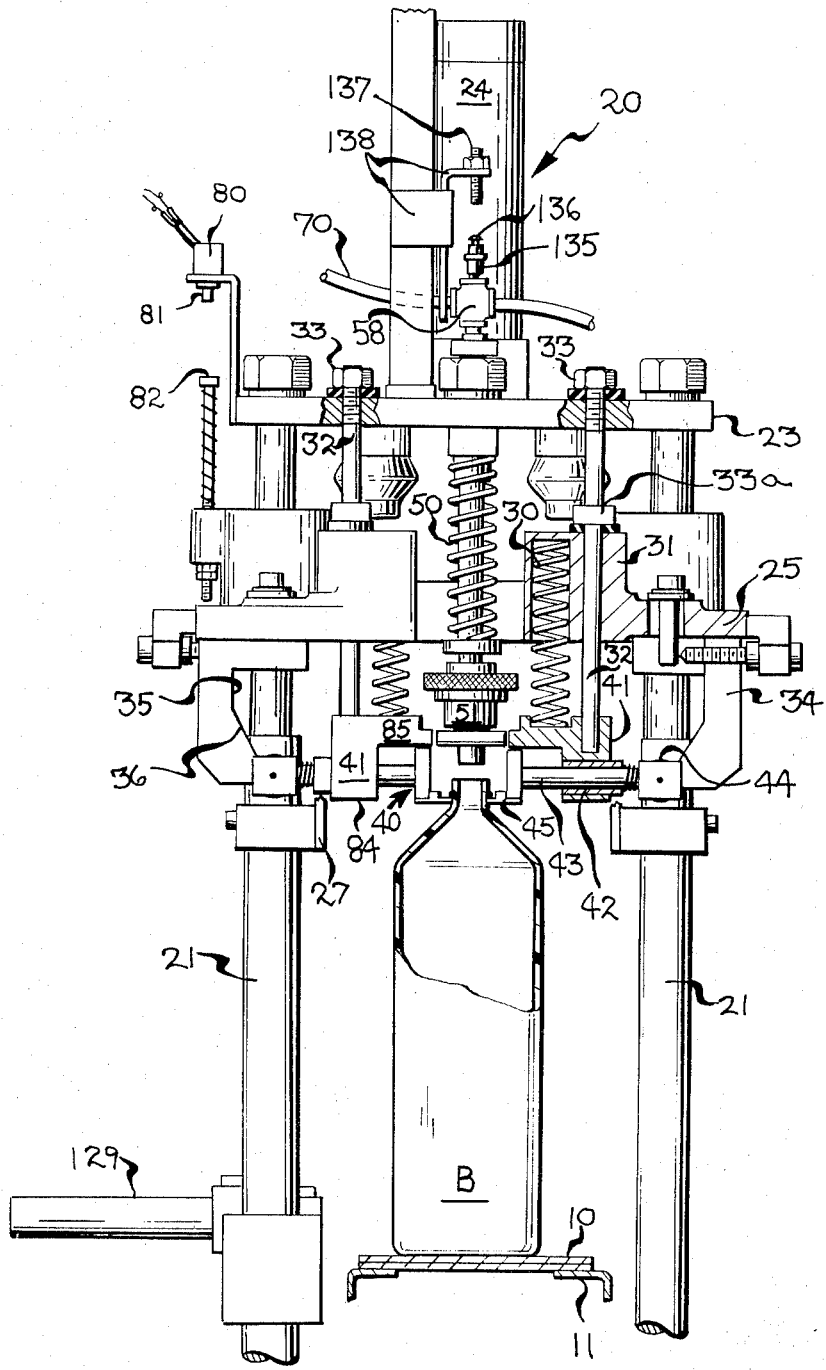
FIG. 3 is a view similar to FIG. 2 showing the apparatus moved to a position at which the neck grasping mechanism has engaged the bottle to be tested preparatory to lifting.

Mounted on the movable platform 25 and contained in the housings 31 are a pair of compression springs 30 which serve to urge the support blocks 41 and the movable platform 25 apart. Thus, when the movable platform 25 is at its lower most position and during its initial movement upward the springs 30 serve to temporarily hold the support blocks 41 in a stationary position at their lower most position. Upward movement of the support blocks 41 is effected by means of collars 33a secured to the rods 32. Thus, when the movable platform 25 has been raised to a position where the collars 33a are contacted by the tops of the respective housings 31 (FIG. 3), any continued upward movement of such platform will carry with it the support blocks 41.

The support blocks 41 are L-shaped, having vertical legs 84 and horizontal legs 85. Each of the horizontal legs 85 has an abutment 86 (FIGS. 1 and 5) forming its innermost portion.

Figure 4:
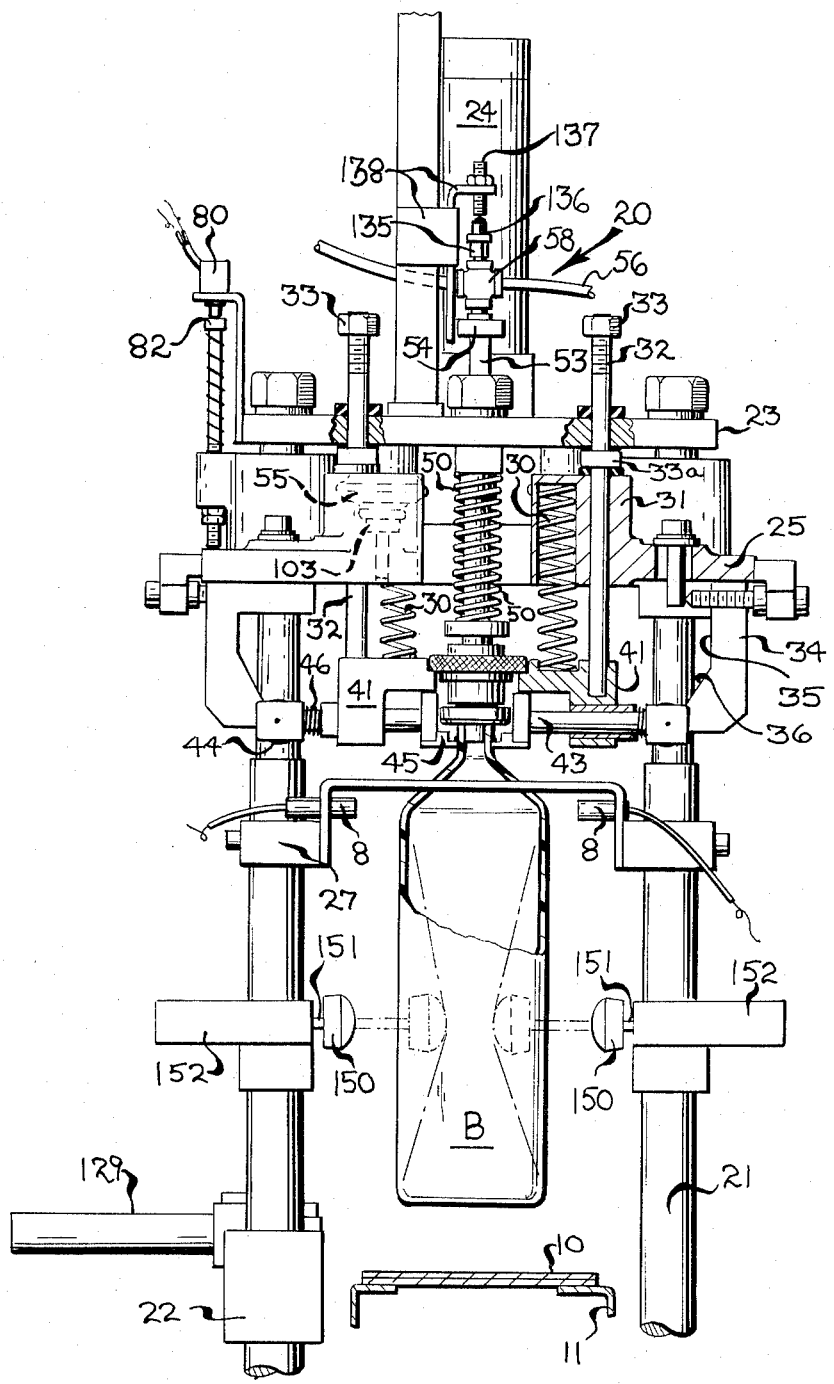
FIG. 4 is a view similar to FIG. 3 showing the apparatus after lifting and introducing pressure into the bottle.

Each support block 41 has an aperture 42 for slideably receiving a movable pin 43. Each of the pins has a cam engaging wheel 44 mounted on one end and a neck gripping yoke 45 mounted on the other end. A compression spring 46 encircles each of the pins 43 and serves to urge the cam engaging wheels 44 against the respective cams 34. It can be readily seen from viewing the drawings that the neck gripping yokes 45 are moved from a position out of engagement with the neck of the bottle B (FIG. 2) to a position in engagement with the neck of bottle B (FIG. 3) by actuating the fluid pressure cylinder 24 to lift the movable platform 25 and thereby move the cams 34 relative to the cam engaging wheels 44. As the cam engaging wheels 44 engage the downwardly and inwardly inclined faces 36 of the respective cams 34, the pins 43 are urged inwardly to cause the neck gripping yokes 45 to engage the neck of the bottle B. Continued upward movement of the movable platform 25 by means of the fluid pressure cylinder 24 causes respective housings 31 thereof to engage the collars 33a and then to lift the closed neck grasping mechanism 40 and the engaged bottle B as showing in FIG. 4.

Extending downwardly from the stationary platform 23 in axial alignment with the neck of a bottle held by the gripping yokes 45 is a rod 53 having a sealing head 51 mounted on the lower end thereof. The sealing head has a plug gage 51a extending from the lower end, the purpose of which will be described later. The rod 53 is slideable with respect to stationary platform 23 and is yieldingly urged downwardly by a compression spring 50 positioned between it and the upper end of the sealing head 51. A nut 54 secured to threads at the free end of the rod 53 serves to determine the lowermost position of the rod 53 and, hence of the sealing head 51. A passageway 52 for directing air into the bottle extends through the rod 53, the sealing head 51 and the plug gage 51a.

It can be readily seen that the sealing head 51 is free floating and is positioned for engagement by the top rim of the bottle B being tested as it is lifted by the neck grasping mechanism 40. As the bottle B and the neck grasping mechanism 40 continue to be lifted, the sealing head is urged upwardly.

The sealing head serves a dual function in that it normally serves as the conduit through which air is directed into the bottle and, yet, in combination with the neck grasping mechanism 40 prevents a pressure build-up in a bottle if the neck portion thereof is shorter than specified or if an obstruction due to flash is present on the inside of the neck. Before describing the means for pressurizing the bottles, this latter feature will be described.

Referring to FIG. 5, the sealing head 51 has a rubber sealing pad 89 at its lower end immediately above the plug gage 51a and a threaded sidewall 90 to which is engaged a threaded knob 91. The threaded knob has an abutment 92 which extends radially outwardly to a position overlying the abutments 86 of the respective support blocks 41. When the neck grasping mechanism 40 and the engaged bottle B are raised, contact will be made with the sealing head 51. If the neck of the bottle B is equal to or greater than the height specified as being within tolerance, such contact will be between the top rim of the bottle B and the sealing pad 89. If the neck is less than the height specified, the abutments 86 of support blocks 41 will contact the abutment 92 of threaded knob 91 thus keeping the rim out of sealing contact with the sealing pad 89 and preventing a build up of pressure in the bottle B. As is apparent, the mechanism may be adjusted to check the neck heights of bottles having different specified heights simply by rotating the threaded knob 91 to raise or lower it on the sealing head 51.

Irrespective of the neck height, if the interior of the neck has an obstruction, for example as caused by unwanted flash, the plug gage will strike it and prevent the rim from sealingly engaging the sealing pad 89. The plug gage is somewhat smaller than the normal inside diameter of the neck and will, therefore, fit readily in such neck opening unless an obstruction is present.

The means for supplying air to the passageway 52 for pressuring the bottle includes a pair of collapsible rubber bulbs 55 mounted on the stationary platform 23 and a pair of upstanding studs having enlarged heads 103 in alignment therewith. As can be seen from FIGS. 1 and 4, continued upward movement of the movable platform 25 after engagement of the enlarged heads 103 against the bulbs 55 collapses the bulbs and expels air therefrom into tubes 56 connected between them and a coupling 58 connected to the rod 53. The positioning of the respective parts is such that unless the bottle being tested has a low neck or an obstruction as described above, it is sealingly engaged to the sealing pad 89 during collapse of the bulbs causing the air expelled during such collapse to flow through the tubes 56, coupling 58, and passageway 52 into the bottle B, thereby pressurizing the bottle. The pressure in the bottle is rather small, on the order of one to two inches water.

The apparatus of the present invention is also capable of detecting and rejecting bottles in which the neck is too high. As previously noted, if the neck is equal to or greater than the height specified as being within tolerance, the top rim of the bottle B will contact the sealing pad. In this case, the sealing head 51 is urged upwardly overcoming the resistance of the compression spring 50 solely by the rim pushing against the sealing pad 89. Therefore, the height to which the sealing head is pushed will be determined solely by the height of the neck.

Mounted on the coupling 58 is a normally closed valve 135 having an upwardly extending peg 136. The valve is opened to atmosphere by depressing the peg 136. Positioned directly above the peg 136 is a threaded stud 137 supported on brackets 138 mounted on the stationary platform 23. The height of the threaded stud is adjustable so that the peg 136 will contact it only if the neck of the bottle B is greater than the specified height tolerance. If the neck exceeds such tolerance, the rod 53 will be urged upwardly to a position at which the peg 136 will engage and be depressed by the stud 137 thereby opening the valve 135. Such opening prevents a build up of pressure in the bottle and indicates that the bottle is defective.

Connected to the rod 53 and tied in to the passageway 52 is a second tube 70 connected through a pressure relief switch 110 (FIG. 6) to a conventional pressure sensing mechanism designated generally by the numeral 71. An auxiliary tube 70a leads from the switch 110 to a dial gauge 111 on which the pressure in the bottle can be visually read. The pressure sensing mechanism 71 may be a Hays pressure switch, Model No. 212-100-01-C, having a range of 0–10 inch water column manufactured by The Hays Corporation, Michigan City, Indiana. The mechanism includes a pressure switch 72 having a resilient diaphragm 73. The pressure switch 72 communicates with the tube 70 leading to one side of the diaphragm and communicates, on the other side of the diaphragm, with atmosphere, as by an aperture 74. Extending outwardly from the pressure switch 72 is an arm 75 having an enlarged head 76. Any suitable switch 77 such as a reed switch or magnetic switch is positioned slightly to one side of the enlarged head 76. The switch is to the left of the enlarged head 76 as viewed in FIG. 6 and to the right as viewed in FIGS. 7 and 8. The enlarged head is normally urged out of contact with the switch 77 by a spring 61 secured between arm 75 and the free end of an arm 61a extending from a fixed block 60. The block 60 is mounted on any supporting means (not shown) and includes a set screw 60a which serves to pivot the arm 61a and adjust the tension on the spring 61. The spring 61 urges the arm 75 against an adjustable stop 71a where it is normally positioned during the "at rest" interval between bottles being tested.

As is well known, the arm 75 and diaphragm 73 of the Hays pressure switch 72 are so interconnected that movement of the diaphragm 73 in one direction causes the arm 75 to move in the opposite direction and vice versa. Thus, as may be seen in FIGS. 7 and 8, the Hays pressure switch is in an "at rest" position with the arm 75 being urged to the left against the adjustable stop 71a and the diaphragm 73 being deflected or bulged to the right. When pressure is introduced into the bottle B being tested and, hence, into the pressure switch 72, the diaphragm 73 is urged in the same direction. However, it is not deflected further because the adjustable stop 61a prevents further movement of the arm 75 to the left as viewed in FIGS. 7 and 8.

A fluid pressure cylinder 62 is provided to attempt to draw the arm 75 toward the switch 77 immediately following the step of pressurizing the bottle. A rod 62a extending from the forward end of cylinder 62 is set to retract a constant distance upon the introduction of pressured fluid to the forward end thereof. The rod 62a is connected to a spring 69 which in turn is secured to the arm 75. Thus, the force acting to pull the arm 75 toward the switch 77 depends on strength of the spring 69.

The movement of the arm 75 caused by retraction of the rod 62a urges the diaphragm in the opposite direction creating a rapid build-up of pressure in the bottle being tested. Such build-up of pressure tends to expel air from the bottle through any pin holes present much faster than would otherwise occur. If the bottle B is defective, the leakage will result in a sufficient pressure loss during the period the rod 62a is retracted that the arm 75 will be drawn to an extreme position at which the head 76 closes the switch 77. If the bottle B is satisfactory, the pressure contained therein will successfully resist the force of the spring 69 caused by retraction of the rod 62a and will prevent movement of the enlarged head 76 to a position causing actuation of the switch.

The length of time the arm is retracted is determined by a timer not shown. Although the length of time may be varied to detect various size holes, it has been determined that holes of 0.010 inch can be detected in less than one-half (½) second after the bottle is pressurized and at speeds approaching two-tenths (0.2) second. Holes of 0.005 inch have been detected in one second.

In testing bottles of different volumes, it is necessary to adjust the length of arm 75 movement needed to actuate the switch 77. Thus, a shorter arm movement should be required to reject a small bottle than to reject a large bottle because a small bottle will have a greater pressure build-up per given length of arm 75 movement than a large bottle. The length of arm movement needed to actuate the switch may change by moving the adjustable stop 71a which determines the "at rest" position of the arm.

If a switch relying on proximity rather than actual contact of the head 76 is used for the switch 77, it will be desirable to provide a stop 71b to limit movement of the arm 75 theretoward. Thus, if a reed type switch having a glass housing is used, contact between the head and the switch should be avoided to prevent breakage of the glass.

If desired, other means may be used to create a pressure build-up in the bottle being tested. Such means include a pair of pads 150 on the free end of rods 151 extending from fluid pressure cylinders 152. (See FIGS. 4 and 6). The cylinders 151 are mounted on the respective guide rods 21 so that the pads 150 are on opposite sides of the bottle B being tested. Extension of the rods 151 causes the pads 150 to engage and then partially collapse the bottle B thereby increasing the pressure therein, as shown in phantom lines in FIG. 4.

Figure 1:
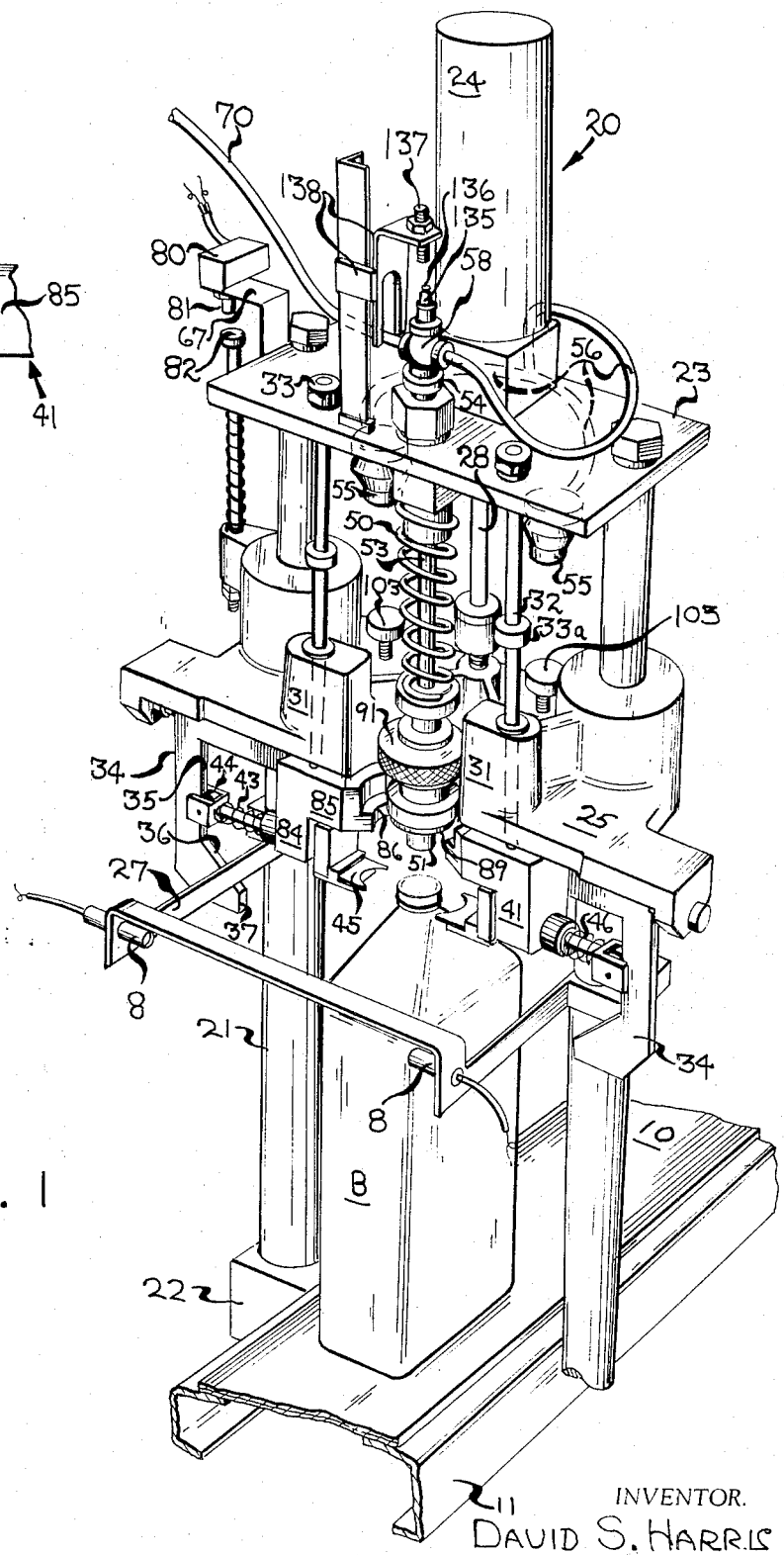
FIG. 1 is a perspective view illustrating the apparatus of the present invention.
Figure 6:
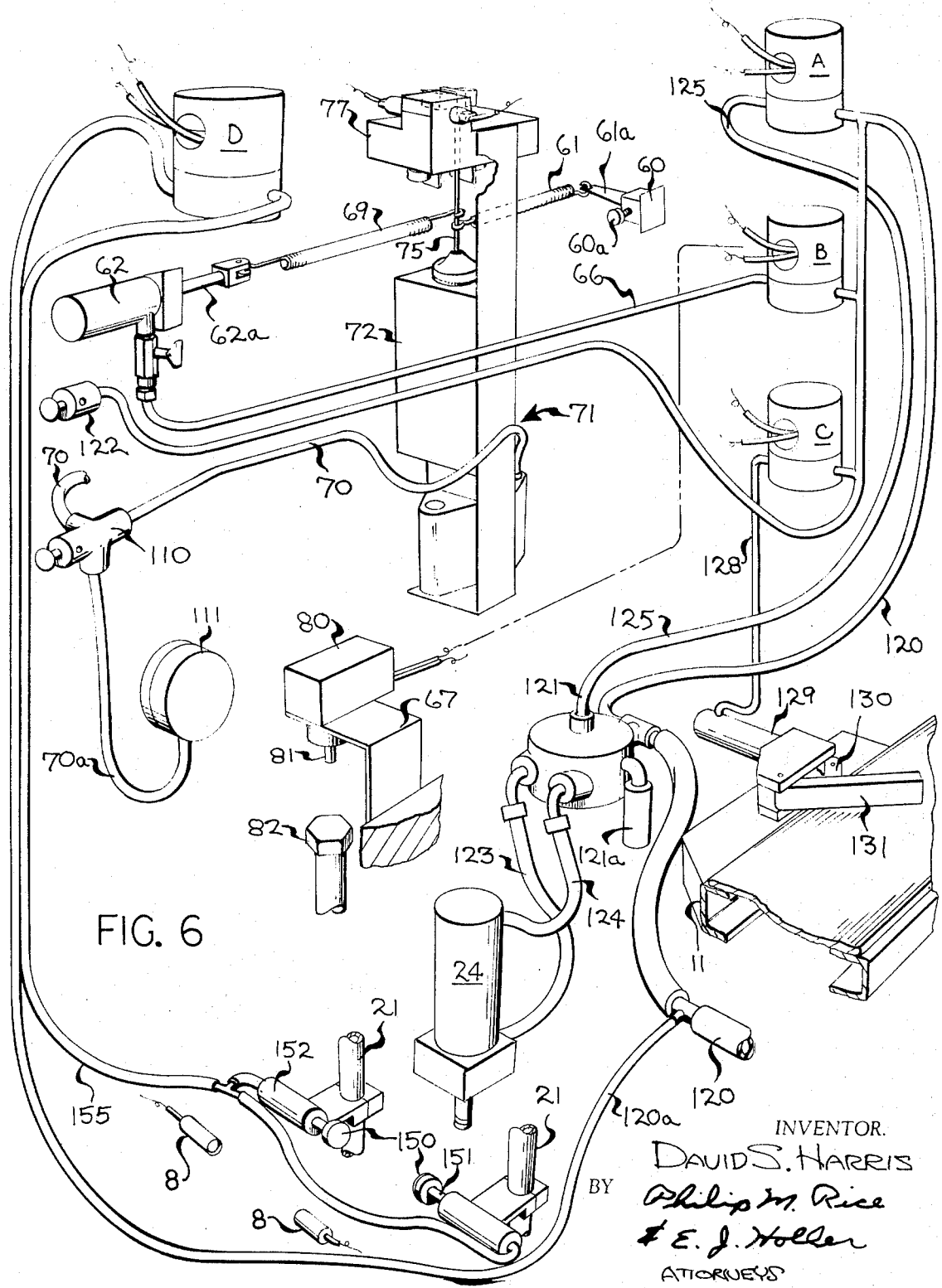
FIG. 6 is a schematic view showing the pneumatic and wiring connections of the leak detector.

A better understanding of the invention will be gained from a review of the pneumatic and wiring connections for testing the bottles B and disposing of the rejects which are shown schematically in FIGS. 6 and 7. Referring to FIGS. 1 and 6, it should initially be noted that the lines 56, 70 and 70a do not form part of the pneumatic system but rather serve simply as conduits for directing air from the collapsible rubber bulbs 55 to the bottle B and to the pressure switch 72 and dial gauge 111.

The pneumatic system includes a main air line 120 connected to a source of compressed air (not shown). The main air line 120 is connected to supply air to (1) a valve 121 controlling the flow of air to the fluid pressure cylinder 24 connected to the stationary platform 23, (2) four solenoid valves A, B, C and D, and (3) a pressure relief valve 122. The connection to solenoid valve D is through tap line 120a.

The valve 121 functions to direct air to the front or back of cylinder 24 through lines 123 and 124 depending on whether the cylinder 24 is to raise or lower the movable platform 25. The valve is a diaphragm type controlled by the presence or absence of air pressure directed to the top thereof through line 125 which in turn is controlled by the solenoid A. Initial actuation of the solenoid A results from an electrical impulse directed thereto from the electric eye 8 upon detecting the presence of a bottle to be tested. The opening of the solenoid valve A permits pressured air to flow from the main air line 120 through the line 125 to depress the diaphragm in valve 121. Such depression of the diaphragm directs air introduced into the valve 121 from the main air line 120 to flow to the line 123 connected to the forward or lower end of cylinder 24 thereby retracting the piston rod 28 and raising the movable platform 25. When the solenoid valve A is closed and no air is directed through line 125, the diaphragm is relaxed causing air introduced into the valve 121 from the main air line 120 to flow through line 124 connected to the rear or upper end cylinder 24 thereby lowering the movable platform 25. The valve 121 is provided with a vent 121a to permit the diaphragm to relax upon closing the solenoid valve A.

The solenoid valve B is electrically connected to a switch 80 and upon actuation thereby opens to direct air from the main air line 120 through line 66 connected to the forward end of fluid pressure cylinder 62 to thereby retract the rod 62a. The switch 80 is mounted on a support member 67 extending upwardly from stationary platform 23 and has a plunger 81 extending downwardly therefrom. Mounted on the upper movable platform 25 in alignment with the plunger 81 is an upright post 82. The height of the post 82 is such that it depresses the plunger 81 as the movable platform 25 reaches its uppermost position and as the rubber bulbs 55 complete the introducing of air into the bottle B. Depression of the plunger 81 energizes the switch 80 causing a signal to be transmitted to the solenoid valve B, opening it and permitting pressured fluid to flow to the forward end of the cylinder 62, thereby retracting the rod 62a and stretching the spring 69. The tension caused by stretching the spring tends to urge the arm 75 toward the reed switch 77. As previously noted, if the bottle is satisfactory, the tendency to move the arm 75 toward the switch 77 will be successfully resisted by the pressure on the opposite side of the diaphragm 73 and the head 76 will remain out of contact of the switch 77. If the bottle is defective, air will be expelled therefrom, reducing the pressure therein, and thus permitting the head 76 to move to a position at which it actuates the switch 77. Such actuation will occur regardless of whether the defect is due to pin holes in the bottle or out of tolerance neck portions. The point is that any defect which prevents retention of pressure will be detected and result in rejection of the bottle.

The solenoid valve C is electrically connected to the magnetic switch 77. Actuation of the solenoid valve C will result when a defective bottle B permits the enlarged head 76 to contact the switch 77. Such actuation opens the solenoid valve C to direct air from the main air line 120 through line 128 leading to the rear end of a fluid pressure cylinder 129 mounted on the support mechanism 11. The cylinder 129 has a rod 130 to which is connected a kicker bar 131. Thus, air introduced through the line 128 will serve to extend the rod 130 and knock the defective bottle from the conveyor 10. The solenoid C is provided with a time delay mechanism which delays actuation of cylinder 129 until the defective bottle to be removed has been released by the neck gripping yokes 45.

Solenoid valve D is provided when it is desired to use the pads 150 squeezing the bottle B being tested to build up pressure therein. Such pads can be used either in place of the collapsible bulbs 55 or as a supplement thereto. The solenoid valve D is actuated by the same switch 80 that actuates solenoid valve B upon raising of the movable platform 25 to its uppermost position. Such actuation opens the solenoid valve D and permits pressured air to flow therethrough from line 120a to line 155 to the rear ends of the respective cylinders 152 extending the rods thereof and thus moving the pads 150 to a position which partially collapses the bottle B as shown in phantom lines in FIG. 4.

For some applications, in lieu of using the pads 150 to squeeze the bottles, it is desirable to move them to a position where they will lightly contact opposite sides of such bottles. This positioning of the pads 150 is especially desirable when testing bottles having flat sidewall portions which would otherwise be subject to bulging. When the pads 150 are moved only to a position of light contact, the solenoid D may be connected for actuation by the electric eye 8 so that the pads 150 will contact the bottle B as it is moved upwardly.

It has also been determined that for some bottles, a sufficient pressure build-up for testing may be obtained simply from movement of the diaphragm 73. Under this modification, the collapsible bulbs 55 and the air lines 56 leading therefrom may be dispensed with. Thus, when the movable platform 25 reaches a position where the upright post 82 depresses plunger 81 energizing switch 80 and, thus opening solenoid valve B, the cylinder 62 will act to draw the arm 75 toward the switch 77. Such movement of the arm 75 moves the diaphragm 73 in a direction (to the left in FIG. 7) expelling air through line 70 and into the bottle B. If the bottle B is satisfactory, the rapid pressure build-up will prevent the arm 75 from moving far enough for the enlarged head to contact the switch 77. In order to obtain a sufficient pressure build-up under this modification, it is desirable to increase the distance through which the arm 75 may travel by moving the adjustable stop 71a to its extreme left position as viewed in FIGS. 7 and 8.

The present invention which provides a positive means for attempting to expel air from the bottle being tested permits a speedier detection of the defective bottles than heretofore known. The leak detector of the present invention can detect a 0.010 inch hole in a plastic bottle in less than one-half (½) second after pressurizing the bottle. In contrast, testing apparatus of the type described in application Ser. No. 866,409, filed Aug. 29, 1969 (assigned to the assignee of the present invention) requires approximately one second after pressurizing the bottle to detect a 0.010 inch hole.

It can be seen from the foregoing that the present invention provides an economical and compact unit for the testing of plastic bottles for leaks resulting from small holes therein. Additionally, although utilizing the principle of pressure testing, it does not require an outside source of air pressure. It permits high speed testing of bottles and, yet, is extremely reliable.

Several modifications will become readily apparent to those skilled in the art.

I claim:

1. Apparatus for leak testing a hollow article having a neck portion defining an opening comprising
   a. a support member for supporting the article to be tested,
   b. a test head positioned over said support member, said test head having sealing means to isolate the interior of said article from atmosphere,
   c. means yieldably supporting said test head for movement along the axis of said neck portion from a normal lower position to an upper position,
   d. means engagable with said neck portion for moving said article into engagement with said test head and for continuing said movement to urge said test head upwardly,
   e. means responsive to said movement for introducing pressure into said article, f. a pressure switch having a variable volume chamber communicating with the interior of said article, said pressure switch operable to detect the loss of pressure therein through means actuated by a predetermined amount of contraction in said chamber, and g. means for attempting to contract said chamber.

2. The apparatus as defined in claim 1 wherein said test head has a plug gauge sized to fit within the opening of said neck to permit sealing engagement between the test head and an article having a neck opening within a specified tolerance and to prevent sealing engagement between the test head and an article having a neck opening outside said tolerance.

3. The apparatus as defined in claim 1 further including means to prevent sealing engagement between the test head and the article being tested when said neck portion is shorter than specified.

4. The apparatus as defined in claim 3 including first abutment means associated and axially movable with said neck engaging means and second abutment means associated and axially movable with said test head, said first and second abutment means being axially aligned and spaced apart a predetermined distance, said predetermined distance being directly related to the specified height of said neck.

5. The apparatus as defined in claim 1 wherein the distance moved by said test head is determined by the height of said neck portion and further including pressure relief means operable to vent pressure from the article upon movement of the test head beyond a predetermined distance.

6. The apparatus as defined in claim 1 wherein the means for introducing pressure in the article comprises means for partially collapsing said article.

7. Apparatus for leak testing a hollow article having a neck portion defining an opening comprising
  a. a support member for supporting the article to be tested,
  b. a test head positioned over said support member, said test head having sealing means to isolate the interior of said article from atmosphere,
  c. means yieldably supporting said test head for movement along the axis of said neck portion from a normal lower position to an upper position,
  d. means engageable with said neck portion for moving said article into engagement with said test head and for continuing said movement to urge said test head upwardly,
  e. means responsive to said movement for introducing pressure into said article,
  and (f) means to prevent sealing engagement between the test head and the article being tested when said neck portion is shorter than specified.

8. The apparatus as defined in claim 7 including first abutment means associated and axially movable with said neck engaging means and second abutment means associated and axially movable with said test head, said first and second abutment means being axially aligned and spaced apart a predetermined distance said predetermined distance being directly related to the specified height of said neck.

9. Apparatus for leak testing a hollow article having a neck portion defining an opening comprising,
  a. a support member for supporting the article to be tested,
  b. a test head positioned over said support member, said test head having sealing means to isolate the interior of said article from atmosphere,
  c. means yieldably supporting said test head for movement along the axis of said neck portion from a normal lower position to an upper position,
  d. means engageable with said neck portion for moving said article into engagement with said test head and for continuing said movement to urge said test head against its yielding support means, the distance moved by said test head being determined in part by the height of said neck portion,
  e. means responsive to said movement for introducing pressure into said article,
  and (f) pressure relief means operable to vent pressure from the article upon movement of the test head beyond a predetermined distance.

10. In apparatus for leak testing a hollow article having an opening including
  a. a support member for supporting the article to be tested,
  b. a self-contained unit having a variable sized chamber for holding a supply of air,
  c. means for sealing said opening,
  d. means responsive to relative movement between said article and said unit for reducing the size of said chamber and evacuating the air therefrom,
  e. communication means for directing air evacuated from said chamber into said article to cause a pressure build-up therein,
  f. a pressure switch communicating with the article for sensing the loss of pressure therein,
  g. the improvement comprising means for creating a pressure surge within the article following said pressure build-up.

11. The apparatus as defined in claim 10 wherein the means for creating a pressure surge within the article comprises an expansible chamber in the pressure switch and means for contracting said chamber.

12. Apparatus for leak testing a hollow article comprising (a) means for sealing said article from atmosphere, (b) means for creating a pressure within said sealed article, (c) pressure detecting means communicating with the interior of said article, the volume contained within that portion of the system subjected to pressure following actuation of the pressure creating means being a fixed size, said volume being defined by (1) the interior of the article, (2) the pressure creating means, (3) the pressure detecting means, and (4) means causing communication between (1), (2) and (3) above and (d) means for reducing said volume to increase said pressure.

13. Apparatus for leak testing a hollow article having a neck portion defining an opening comprising
  a. a support member for supporting the article to be tested,
  b. a test head positioned over said support member, said test head having sealing means to isolate the interior of said article from atmosphere,
  c. means for imparting relative movement between said test head and said neck portion to bring them toward a position of engagement,
  d. means for introducing pressure into said article, and
  e. means to prevent sealing engagement between the test head and the article being tested when said neck portion is shorter than specified.

14. The apparatus as defined in claim 13 further including means engageable with said neck portion for supporting said neck portion during engagement with said test head.

15. The apparatus as defined in claim 14 including first abutment means mounted on said neck supporting means and second abutment means mounted on said test head, said first and second abutment means being axially aligned and spaced apart a predetermined distance, said predetermined distance being directly related to the specified height of said neck.

16. Apparatus for leak testing a hollow article having a neck portion defining an opening comprising,
   a. a support member for supporting the article to be tested,
   b. a test head positioned over said support member, said test head having sealing means to isolate the interior of said article from atmosphere,
   c. means for engaging said neck portion at a predetermined position above said support member,
   d. means for imparting relative movement between said test head and said neck portion to bring them into sealing engagement, the axial distance between said means for engaging said neck portion and the test head when engaged with the neck portion being determined by the height of said neck portion,
   e. means for introducing pressure into said article, and
   f. pressure relief means operable to vent pressure from the article when the spacing between the means engageable with neck portion and the test head is greater than a predetermined distance.

* * * * *